Nov. 11, 1924.

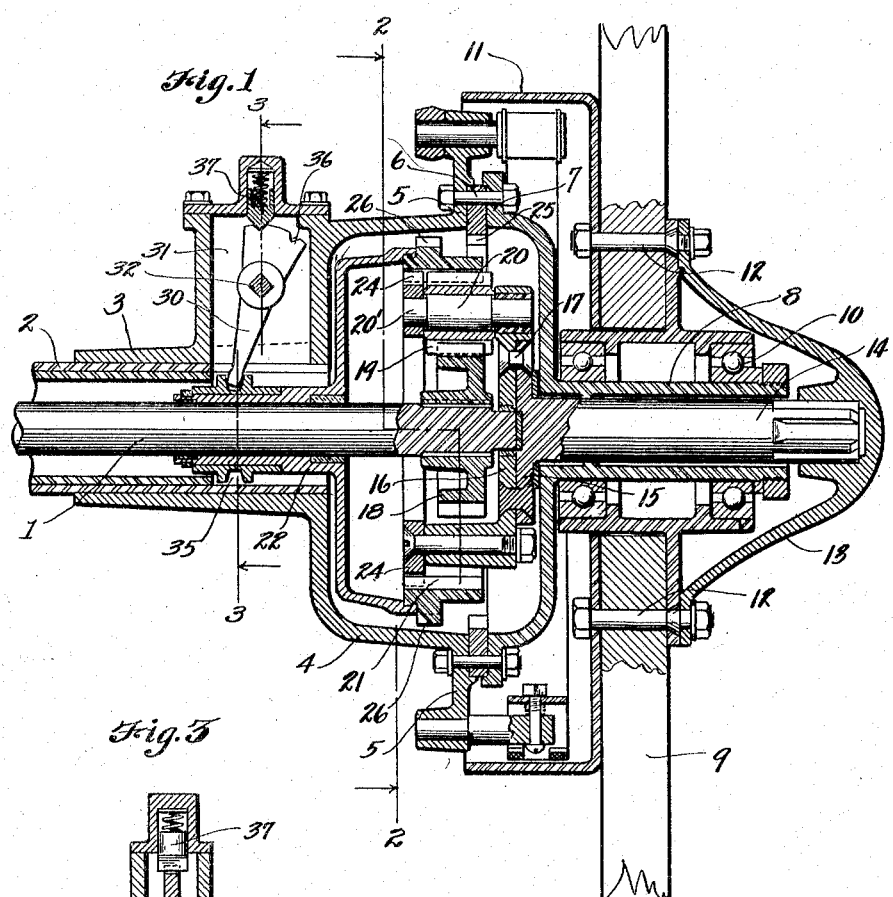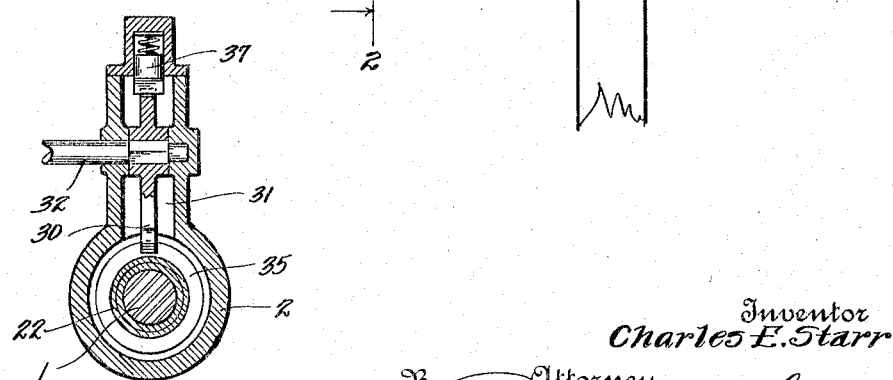

C. E. STARR 1,514,872

VEHICLE DRIVING GEAR

Filed Aug. 20, 1921        2 Sheets-Sheet 2

Inventor
CHARLES E. STARR
By Richard J Cook
Attorney

Patented Nov. 11, 1924.

1,514,872

UNITED STATES PATENT OFFICE.

CHARLES E. STARR, OF OAKLAND, CALIFORNIA.

VEHICLE DRIVING GEAR.

Application filed August 20, 1921. Serial No. 493,915.

*To all whom it may concern:*

Be it known that I, CHARLES E. STARR, a citizen of the United States, and a resident of the city of Oakland, county of San Francisco, State of California, have invented certain new and useful Improvements in Vehicle Driving Gears, of which the following is a specification.

This invention relates to driving mechanism for motor driven vehicles, and more particularly to an improvement on the mechanism disclosed in my pending application on vehicle driving gears, filed June 28, 1921, and bearing Serial No. 481,162.

The principal object of this invention is to provide a variable speed driving gearing embodying a planetary gear system which is located adjacent or within the hubs of the driving wheels of a vehicle, and which is so designed that, by a certain shifting of gears, a high speed can be imparted to the wheels when the load is light or a low speed with a maximum amount of power can be had when the load is heavy.

A further object of the invention resides in the adaptation and combination of a planetary gear system with the differential shafts and driving wheels of a motor vehicle and in the improved method of shifting and locking the gear whereby various speeds are attained.

In accomplishing these and other objects of the invention, I have provided the improved details of construction, the preferred forms of which are illustrated in the accompanying drawings, wherein—

Fig. 1 is a central sectional view taken longitudinally of the rear axle of a motor vehicle, showing a gearing construction embodying the present invention connected with the differential shaft and wheel.

Fig. 3 is a compound sectional view taken in the planes indicated by the line 3—3 of Fig. 1.

Figure 2:
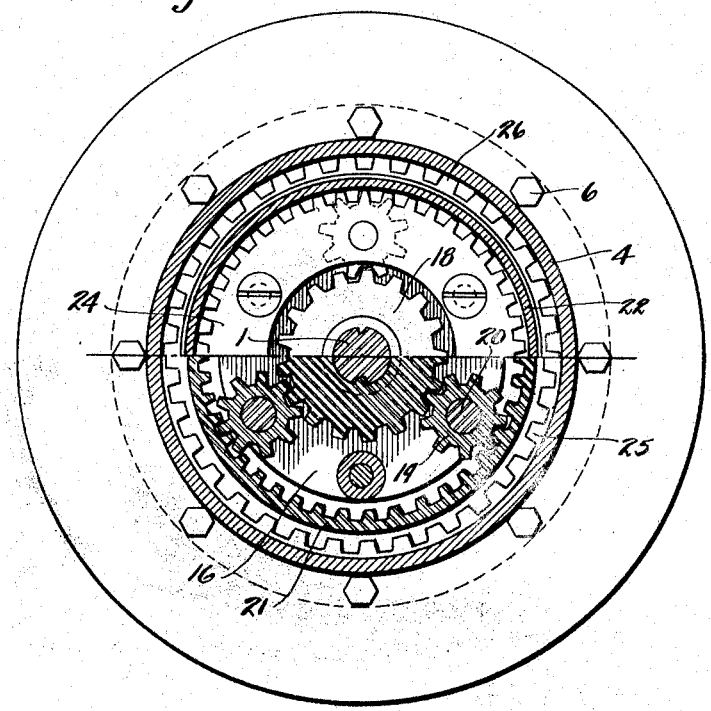
Fig. 2 is a transverse section taken on the line 2—2 in Fig. 1, showing the gear shifting means.

The driving gearing hereinafter described is duplicated on both sides of the differential gearing of a motor vehicle, but in the present drawings only one set is illustrated and the differential gearing is not shown. It is to be understood, however, that any desirable driving and differential mechanism, such as that ordinarily used in trucks and automobiles, can be used in connection with the present mechanism.

Referring more in detail to the drawings—

1 designates a section of a differential axle that is mounted for rotation within an axle housing 2 and which is connected at one end with the differential mechanism, not shown, and at its opposite, or outer end, with the driving gearing embodying the present invention.

Fitted over, and rigidly fixed to the outer end of the housing 2 is a sleeve 3, enlarged at its end to form an outwardly opening drum 4 provided with a peripheral flange 5 through which bolts 6 are projected to secure thereto the registering flange 7 formed about the inner end of a hub, or bearing sleeve 8, upon which a vehicle wheel 9 is rotatably mounted. The hub flange 7 and drum 4 together form an enclosed housing wherein the driving gear mechanism is enclosed.

The wheel 9 is mounted upon the hub 8 through the intermediacy of antifriction bearings 10, which may be of any desirable type. It is provided on the interior side with an annular brake drum 11, which is secured to the wheel by means of bolts 12 which also secure the hub cap 13 on the outer face of the wheel. A short driven spindle or shaft 14 extends revolubly through the hub 8 and this, at its outer end, has a splined driving connection with the hub cap 13, and at its inner end terminates in a laterally extending annular flange 15 to which a spider 16 is secured by means of rivets 17.

The gear transmission proper comprises a sun gear 18 that is keyed onto the outer end of the driving shaft 1 and which is in mesh with a series of planet gears 19 that are revolubly supported upon pins 20 that are mounted fixedly within the spider 16. The gear 18 forms the central or sun gear of a planetary gear system and the gears 19, of which there are three, are the intermediate or planet gears of the system. These latter gears are continuously in mesh with the sun gear 18 and with an internally toothed ring gear 21 that is supported within the flanged periphery of a sleeve 22, rotatably mounted on the driving shaft 1.

Mounted concentrically with respect to the ring gear 21, upon the outer ends 20′ of pins 20, is a toothed locking ring 24, and fixed by means of the bolts 6 between the flanges 5 and 7 is an internally toothed locking ring 25 that is also located concentrically with respect to the gear 21. The ring gear 21 has externally formed teeth 26 thereon which are adapted, when this gear is shifted to its outer limit of travel, to mesh with the teeth of the ring 25 thus locking the ring gear to the housing and holding it against rotation. When the gear 21 is moved to its inner limit of travel, as illustrated in Figure 1, it meshes simultaneously with the pinions 19 and teeth of ring 24 thereby locking the intermediate gears against rotation on the pins 20 and consequently effecting a direct driving connection between the shaft 1 and wheel. When shifted to a point intermediate its inner and outer limit of travel, the ring gear 21 will be free of the teeth of both locking rings 24 and 25 and no driving connection will then exist.

The means employed for shifting the ring gear 21 is illustrated in Figures 1 and 3, and consists of a lever 30, located within a pocket 31 formed within the axle housing adjacent the drum 4. This lever is fixed on the end of a control rod 32 which is connected by suitable means operable from the driver's position on a vehicle whereby it may be rotated.

The inner end of the lever extends within an annular groove 35 formed about the sleeve 22 and its outer end is provided with notches 36, into which a spring pressed tooth 37 mounted in the housing may seat to yieldingly retain the lever to hold the sleeve 22 at a set position.

Assuming that the parts of the device are so constructed and assembled as described, the operation is as follows:

To effect a low speed driving connection between the driving shaft 1 and wheel 9, the ring gear 21 is shifted by manipulation of the lever 30, until the teeth 26 thereon lock with the internal teeth of the ring 25. This prevents rotation of the gear 21 and causes the gears 19 to planetate about the shaft 1 as they are driven by the gear 18, thus driving the wheel at a reduced speed which depends on the ratio of the gears used.

To effect a direct driving connection with the shaft 1, the ring gear 21 is moved inwardly until it locks with the teeth of the ring 24, while still in mesh with the planet gears 19. This prevents rotation of the planet gears on the pins 20 and consequently provides a direct driving connection between the driving shaft and wheel, thereby producing what I term the high speed.

Such a construction is very desirable in trucks or freight vehicles as it makes it possible to secure the same high speed as is had in a touring car without driving the engine at an excessive speed, and also provides for high power at a reduced speed when this is desired.

It is also apparent that such gearing could be employed in the ordinary types of automobiles as an emergency feature and the speed reduction gears in the hubs used when more power is needed than can be obtained by the use of the low speed gears of the automobile.

I claim—

1. The combination with a non-rotatable axle housing, a vehicle wheel, and a driving shaft within the housing, of a sun gear fixed on said shaft, planet gears supported revolubly in fixed relation to the wheel and in mesh with said sun gear, a ring gear mounting journaled on the driving shaft, a ring gear on said mounting and meshing with said planet gears, and means for optionally shifting said ring gear into fixed relation with the housing to prevent its rotating and to effect planetation of the planet gears, or into fixed relation with the wheel to effect a direct driving connection between the driving shaft and the wheel.

2. The combination with a non-rotatable housing, a wheel rotatable on a hub extended from the housing, and a driving shaft within the housing having an independently rotatable extension provided with driving connection with the wheel, of a sun gear fixed on the driving shaft, planet gears supported from said shaft extension and meshing with the sun gear, an internally toothed ring gear meshing with the planet gears, locking means fixed in the said housing, other locking means fixed relative to the shaft extension and means for optionally shifting the ring gear to engage with the first of the said locking means to prevent rotation of the ring gear and effect driving of the vehicle wheel by planetary movement of the planet gears, or to engage with the last named locking means to prevent rotation of the planet gears and thereby effect direct driving connection between the driving shaft and its extension.

3. The combination with a non-rotatable housing, a wheel rotatable on a hub extended from the housing and a driving shaft within the housing, of an independently rotatable extension for the shaft provided at its outer end with driving connection with said wheel and with a spider fixed at its inner end, a sun gear fixed on said driving shaft, pins extended from said spider, planet gears mounted on said pins and meshing with the sun gear, a ring gear meshing with the planet gears, locking teeth on said ring gear, a locking ring fixed within the housing, a locking ring fixed on said pins, means for optionally shifting the ring gear to mesh simultaneously with the teeth of the last named locking ring and said planet gears to prevent planetation of the latter within the ring gear and thereby effect direct driving connection between the shaft and wheel, or for moving its locking teeth into mesh with the teeth of the first named locking ring to lock it against rotation and thereby effect driving of the wheel by the planetation of the planet gears.

4. The combination with a non-rotatable housing, a wheel rotatable on a hub extended from the housing and a driving shaft within the housing, of an independently rotatable extension for the shaft provided at its outer end with driving connection with said wheel and at its inner end having a spider fixed thereon, a sun gear on said driving shaft, pins on said spider, planet gears journaled on said pins and meshing with the sun gear, a sleeve slidable on the driving shaft provided with a circumferential groove, a ring gear supported by said sleeve and meshing with the planet gears, locking means on said ring gear, a locking ring fixed within the housing, a locking ring fixed on said pins, a shifting lever pivotally mounted in the axle housing having one end extended into said sleeve groove, and means for actuating the lever to shift the sleeve to move the ring gear into locking relation with the planet gears and last named locking ring, or into locking relation with the first named locking ring.

5. A vehicle driving gear comprising a housing, a driving shaft journaled in said housing, a driven shaft axially alined with said driving shaft and journaled in said housing, a vehicle wheel fixed for rotation with said driven shaft and journaled on said housing, a sun gear on said driving shaft, planet gears supported on said driven shaft and in mesh with said sun gear, a ring gear in mesh with said planet gears, and means for optionally locking said ring gear to said housing or to said driven shaft.

6. A vehicle driving gear comprising a housing, a driving shaft journaled in said housing, a driven shaft axially alined with said driving shaft and journaled in said housing, a vehicle wheel fixed for rotation with said driven shaft and journaled on said housing, a sun gear on said driving shaft, planet gears supported on said driven shaft and in mesh with said sun gear, a ring gear in mesh with said planet gears, clutch elements on said ring gear, complementary clutch elements on said driven shaft and on said housing, and means for moving said ring gear to engage clutch elements thereon optionally with the clutch elements on said driven shaft or with the clutch elements on said housing.

7. A vehicle driving gear comprising a housing, a driving shaft journaled in said housing, a driven shaft axially alined with said driving shaft and journaled in said housing, a vehicle wheel fixed for rotation with said driven shaft and journaled on said housing, a sun gear on said driving shaft, planet gears supported on said driven shaft and in mesh with said sun gear, a ring gear journaled on said driving shaft and in mesh with said planet gears, a locking ring fixed for rotation with said driven shaft, a second locking ring fixed in said housing, and means for optionally engaging said ring gear with either of said locking rings.

Signed at Seattle, Washington, this 15th day of August, 1921.

CHARLES E. STARR.